United States Patent [19]

Chivari

[11] Patent Number: 5,507,692
[45] Date of Patent: Apr. 16, 1996

[54] COUPLING FOR NON-ALIGNED ROTATING PARTS

[76] Inventor: Ilie Chivari, 1 Rue de Beaumont, F-59300 Valenciennes, France

[21] Appl. No.: 244,404

[22] PCT Filed: Nov. 9, 1992

[86] PCT No.: PCT/EP92/02567
§ 371 Date: May 23, 1994
§ 102(e) Date: May 23, 1994

[87] PCT Pub. No.: WO93/11368
PCT Pub. Date: Jun. 10, 1993

[30] Foreign Application Priority Data

Dec. 3, 1991 [DE] Germany .......... 41 39 830.0

[51] Int. Cl.[6] .................................................. F16D 3/62
[52] U.S. Cl. .................. 464/69; 464/81; 464/147
[58] Field of Search .............. 464/147, 71, 81, 464/69

[56] References Cited

FOREIGN PATENT DOCUMENTS

| | | |
|---|---|---|
| 843738 | 7/1939 | France . |
| 979776 | 5/1951 | France . |
| 3049054 | 7/1982 | Germany . |

*Primary Examiner*—Daniel P. Stodola
*Assistant Examiner*—Emmanuel M. Marcelo
*Attorney, Agent, or Firm*—Collard & Roe

[57] ABSTRACT

A Coupling for coupling non-aligned rotating parts is provided with driving-side and driven side coupling halves and an intermediate coupling member including separable parts. The intermediate coupling member is connected with the driving-side coupling half through a first pair of mutually centro-symmetcially arranged links and is connected with the driven side coupling half through a second pair of mutually centro-symmetrically arranged links. In order to facilitate dismantling of the coupling, the intermediate coupling member (10) is composed of two arcuate intermediate coupling member halves (20,22), each of which extends through more than 180°, such that each intermediate member half defines a lateral opening (32), which permits lateral removal of the intermediate member half (20,22) from a shaft passing centrally through the coupling, which are axially offset with respect to each other, and which are angularly offset by 180° with respect to each other.

4 Claims, 3 Drawing Sheets

5,507,692

COUPLING FOR NON-ALIGNED ROTATING PARTS

TECHNICAL FIELD

The invention relates to a coupling for coupling non-aligned rotating parts with driving-side and driven side coupling halves and an intermediate coupling member consisting of separable parts, said intermediate coupling member being connected with the driving-side coupling half through a first pair of mutually centro-symmetrically arranged links and being connected with the driven side coupling half through a second pair of mutually centro-symmetrically arranged links.

UNDERLYING PRIOR ART

Such a coupling is known, for example, from DE-A-3, 049,054.

DISCLOSURE OF INVENTION

It is the object of the invention to simplify the design of a coupling mentioned in the beginning.

According to the invention, this object is achieved in that (a) the intermediate coupling member is composed of two arcuate intermediate member halves,
   each of which extends through more than 180°, such that each intermediate member half defines a lateral opening, which permits lateral removal of the intermediate member half from a shaft passing centrally through the coupling,
   which are axially offset with respect to each other, and
   which are angularly offset by 180° with respect to each other, whereby the opening of each intermediate member half is aligned with the closed median portion of the other intermediate member half, (b) each of the intermediate member halves has a first and a second lug side by side in the regions of each of its ends on both sides of a plane of symmetry extending between the two intermediate member halves, the first lug being provided on the side of the opening, and the second lug being provided on the side of the closed median portion, (c) the first lugs of one intermediate member half is aligned with the second lugs of the other intermediate member half and vice versa, and (d) the links are pivoted on the pairs of aligned lugs.

Modifications of the invention are subject matter of the subclaims.

An embodiment of the invention is described hereinbelow with reference to the accompanying drawings.

PREFERRED EMBODIMENT OF THE INVENTION

Figure 1:
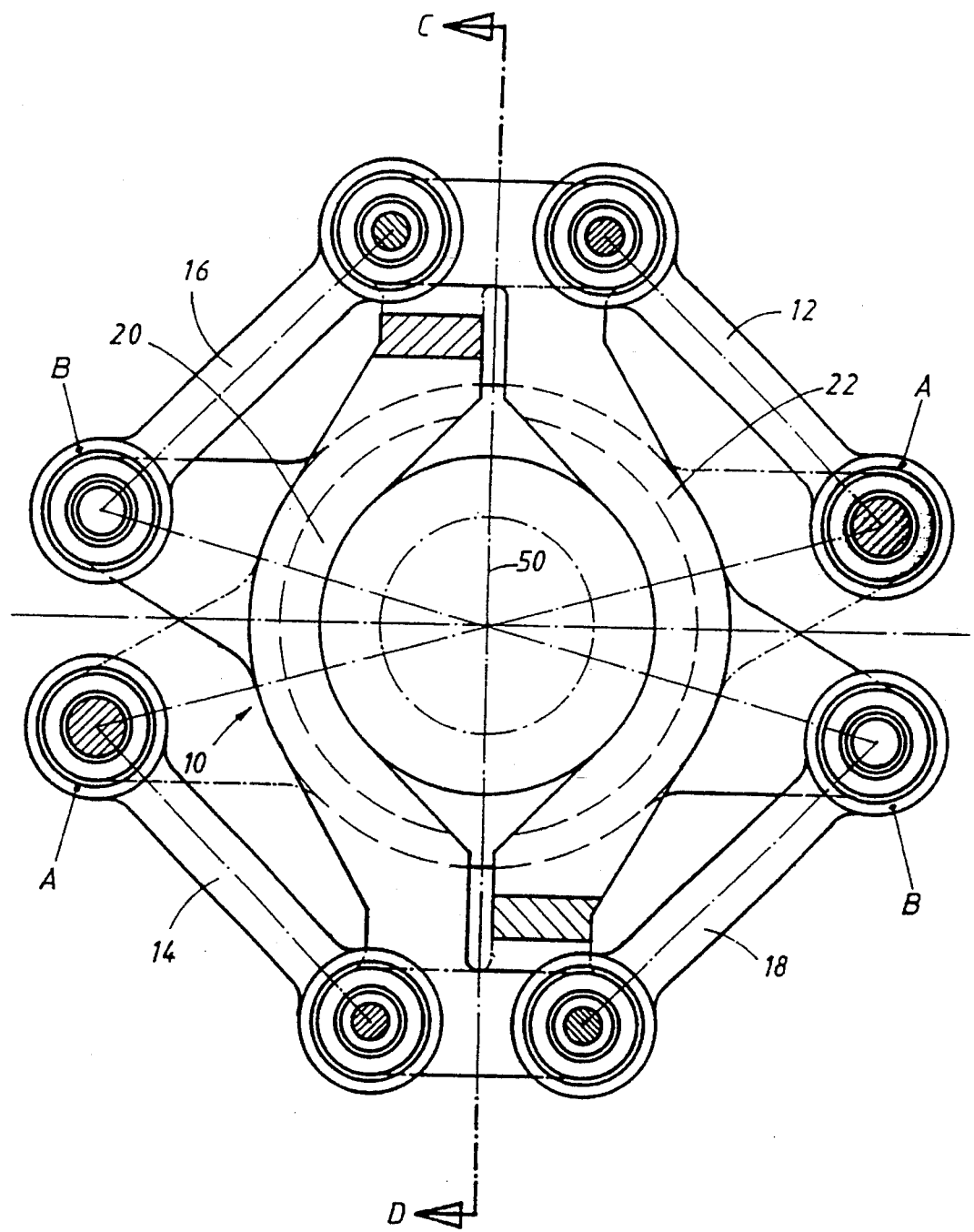
FIG. 1 is a view of a coupling as viewed in axial direction, the coupling halves, which may be part of a machine installation, for example a transmission shaft and a railroad engine, are not shown.

In FIG. 1 numeral 10 designates an intermediate coupling half of a coupling. The coupling couples two rotating parts, for example the transmission shaft and a wheel of a railroad engine, through a first coupling half A and a second coupling half B, respectively. The intermediate coupling member 10 is connected with the driving-side coupling half A through a link 12 and a link 14 arranged centro-symmetrical with respect to the link 12. Furthermore, the intermediate coupling member 10 is connected with the driven-side coupling half through a link 16 and a link 18. The links 12 and 14 extend clockwise around the intermediate coupling member 10. The links 16 and 18 extend counter-clockwise around the intermediate coupling member 10. The coupling permits a certain offset of the axes of driving-side and driven-side coupling halves. With such offset, the links 12 to 18 and the intermediate coupling member carry out a compensating movement.

In the illustrated coupling the intermediate coupling member 10 consists of two intermediate member halves 20 and 22. The intermediate member halves 20 and 22 can be separated radially, after bolts have been detached. Thereby it is possible to dismantle a coupling through which a wheel axle passes, without having to remove the wheel therefor.

Figure 4:
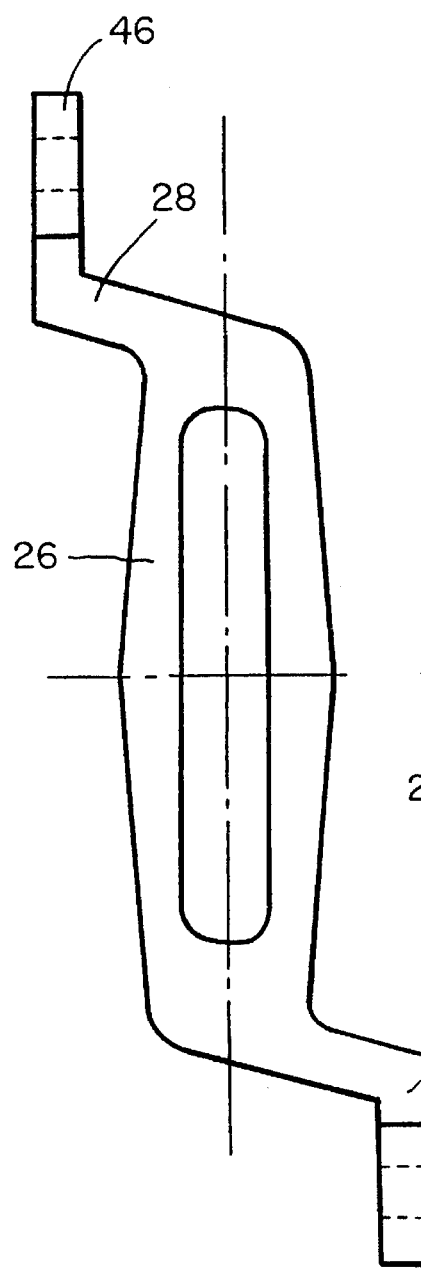
FIG. 4 shows an associated side elevation.
Figure 3:
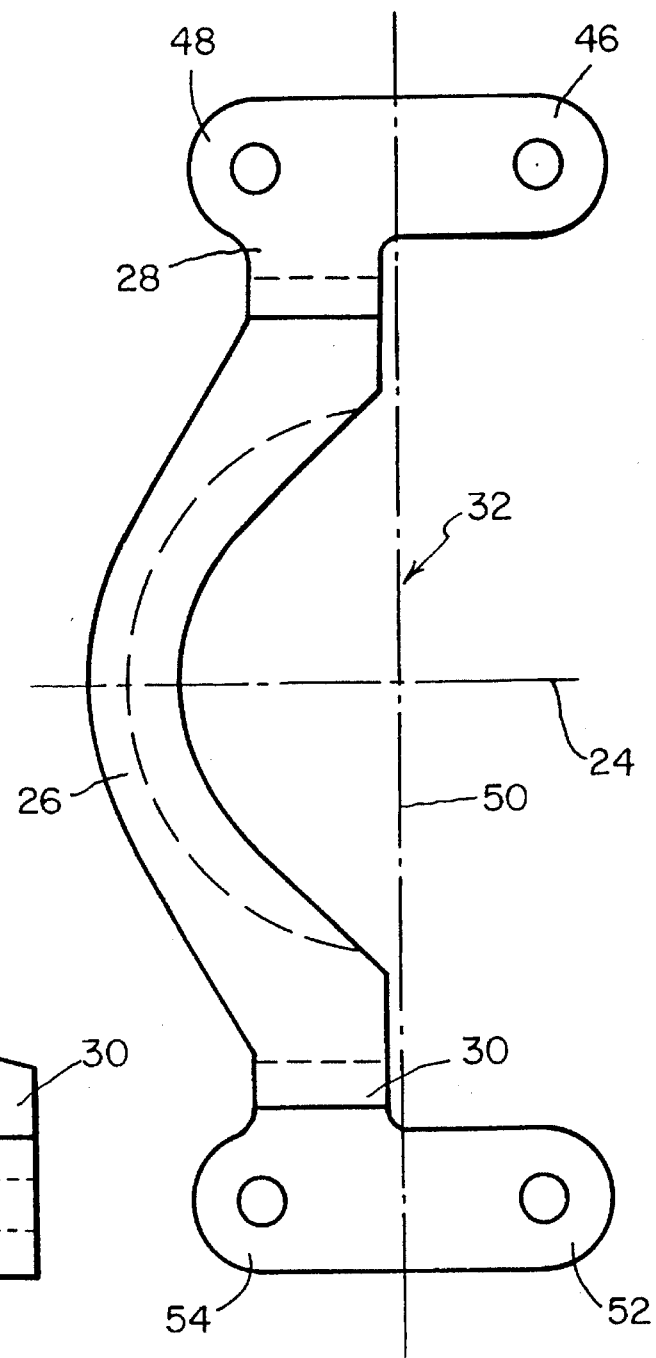
FIG. 3 shows an individual intermediate member half of the coupling of FIG. 1, viewed in axial direction.

An intermediate member half 22 is illustrated separately in FIG. 3 and 4 in an axial view and side elevation, respectively. The intermediate member half 22 extends circumferentially through slightly more than 180° about the axis 24. The intermediate member half 22 has an outwardly curved median portion 26 and two ends 28 and 30. The median portion 26 defines an opening 32 (on the right side in FIG. 3), which permits lateral removal of the intermediate member half from a shaft or axle passing through the coupling. A first and a second lug 46 and 48 are integral with the end 28 of the intermediate member half (at the top left end in FIG. 4). The two lugs 46 and 48 are symmetrical with respect to a plane of symmetry 50 (FIGS. 1 and 3) extending between the two intermediate member halves. The first lug 46 is located on the side of the opening 32. The second lug 48 is located on the side of the closed median portion 26. Correspondingly, a first and a second lug 52 and 54, respectively, are integral with the end 30 of the intermediate member half 22 (at the bottom left end in FIG. 4). The two lugs 52 and 54 are also symmetrical with respect to the pane of symmetry 50 extending between the intermediate member halves 20 and 22. The first lug 52 is located on se side of the opening 32. The second lug 54 is located on the side of the closed median portion 26.

Figure 2:
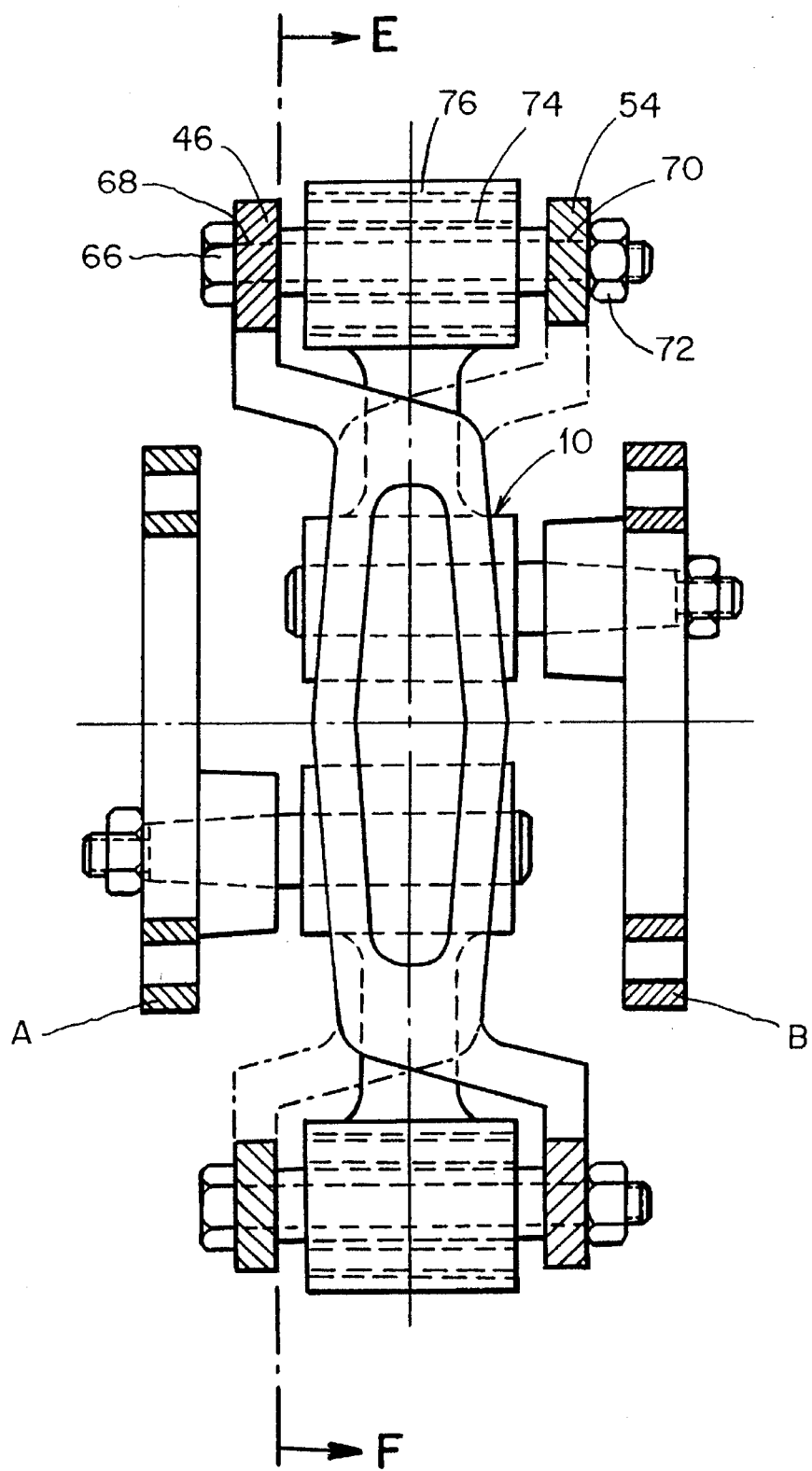
FIG. 2 is a sectional view taken along line C–D of FIG. 1.

The intermediate member half 20 is of identical design as the intermediate member half 22 described. In the coupling and the intermediate coupling member 10, the intermediate member half 20 is built in in a position rotated by 180°. Thereby, the respective "first" lugs, i.e. the lugs on the side of the opening such as 46 and 52 of the intermediate member half 22 are aligned with "second" lugs, i.e. lugs on the side of the median portion, of the intermediate member half 20, which therefore correspond to the lugs 48 and 54 of the intermediate member half 22. The aligned lugs, for example 46 and 54 in FIG. 2 are axially spaced. Threaded bolts 66 extend through holes 68 and 70 of the lugs 46 and 54, respectively, and serve as bearing pins. The threaded bolts 66 are retained by nuts 72. Annular rubber-metal connection joints 74 are placed on the threaded bolts 66, that are cylindrical rubber bodies the inner surface of which is firmly connected with the threaded bolt 66 and the outer surface of which is firmly held in an eye 76 of the link 12.

I claim:

1. Coupling for coupling non-aligned rotating parts with driving-side and driven side coupling halves and an intermediate coupling member consisting of separable parts, said intermediate coupling member being connected with the driving-side coupling half through a first pair of mutually centro-symmetrically arranged links and being connected with the driven side coupling half through a second pair of mutually centro-symmetrically arranged links, wherein (a) the intermediate coupling member is composed of two arcuate intermediate member halves, each of which has a closed median portion, and each of which has a region at its end, each of which extends through more than 180°, such that each intermediate member half defines a lateral opening, which permits lateral removal of the intermediate member half from a shaft passing centrally through the coupling, which are axially offset with respect to each other, and, which are angularly offset by 180° with respect to each other, whereby the opening of each intermediate half is aligned with the closed median portion of the other intermediate member half, (b) each of the intermediate member halves has a first lug and a second lug side by side in the regions of each of its ends on both sides of a plane of symmetry extending through the two intermediate member halves, the first lug being provided on the side of the opening, and the second lug being provided on the side of the closed median portion, (c) the first lugs of one intermediate member half are aligned with the second lugs of the other intermediate member half and vice versa, and (d) the links are pivoted on the pairs of aligned lugs.

2. Coupling as claimed in claim 1, wherein the lugs at the one end of each intermediate member half are axially offset with respect to the lugs at the other end of the intermediate member half.

3. Coupling as claimed in claim 2, wherein a pivot bearing for a respective one of the links is arranged between each of the axially spaced lugs.

4. Coupling as claimed in claim 3, wherein the pivot bearings are formed by annular rubber-metal connection joints which are firmly held with their outside in an eye of the link and with their inner side on a bearing pin extending between the lugs.

\* \* \* \* \*